July 23, 1963  L. A. BERTHIAUME  3,098,399
TRANSMISSION
Filed Sept. 21, 1961

INVENTOR.
LEON A. BERTHIAUME
BY Frank C. Parker
Arthur L. Nelson
ATTORNEYS

United States Patent Office 3,098,399
Patented July 23, 1963

3,098,399
TRANSMISSION
Leon A. Berthiaume, Rochester, N.Y., assignor to Bausch & Lomb Incorporated, Rochester, N.Y., a corporation of New York
Filed Sept. 21, 1961, Ser. No. 139,767
6 Claims. (Cl. 74—366)

This invention relates to a transmission, and more particularly to a transmission having clutching means for selectively engaging a gearing means of a constant output, or of a logarithmic output.

The transmission as illustrated may be used in connection with a chart recording mechanism. This use is merely illustrative for the use, and the inventor does not wish to limit the use of the device to a recording instrument. The transmission may have any number of a plurality of pairs of gears for transmission of a constant ratio between the driving and the driven gears. Along with this combination of constant ratios, the inventor has included a pair of gears having a changing ratio between the gears which changes at a logarithmic rate. The selection of the particular ratio desired is accomplished through a clutching means connecting the driving means to the transmission to provide the desired output.

It is an object of this invention to provide a transmission means having an input and output bearing a logarithmic ratio to each other and also gear means having a constant ratio, with clutching means for selectively engaging the driving means for the desired output of the transmission.

It is another object of this invention to provide a constant ratio gear means and a logarithmic ratio gear means in a transmission means with clutching means for selecting the desired ratio of input to output of the transmission.

It is a further object of this invention to provide in a transmission a constant ratio pair of gear means and a logarithmic ratio pair of gear means, each gear means being in constant engagement with the mating gear means in each pair, with clutch means for connecting the driving means to the transmission to provide the desired ratio of output.

The objects of this invention are accomplished in a transmission having a shaft means rotatably supporting a pair of driving gears. The gears are rotatable about the driving shaft means. A pair of driven gears are fastened to a parallel shaft for constant engagement with the pair of driving gears. The first driving gear and the first driven gear provide a constant ratio of output, dependent on the gear teeth on each of the two gears. The second set of driving and driven gears provide an output which bears a logarithmic ratio to the driving gear. A clutching means is provided to selectively engage the desired ratio of output between the pairs of gears and engages the one of the driving gears to provide this desired output. Both sets of gears of the transmission are in constant engagement with each other. The driving gear connected to the driving shaft provides the desired output through the transmission. The second set of gears, although they are in constant meshing engagement, operate as idler gears which perform no driving function in the transmission.

As the gears are returned, to an extreme position of their rotation, the clutching means may be shifted from one gear to the other to provide the desired output ratio for the transmission.

The following illustrations and description sets forth the preferred embodiment of this invention. Any modification of the preferred embodiment within the principles as illustrated and described in the following paragraphs, are considered to be within the scope of this invention.

Figure 1:
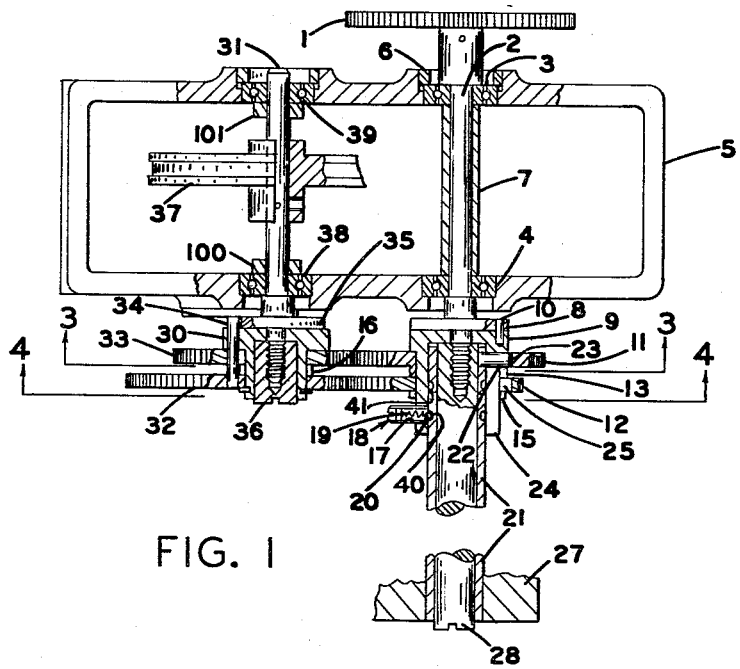
FIG. 1 is a cross-section view taken through the shaft centers of the transmission.

Referring to FIG. 1, a cross-section view of the transmission is illustrated. The gear 1 supplies the driving force to the transmission through the driving shaft 2. Driving shaft 2 is rotatably mounted on the bearing assemblies 3 and 4, which are retained within the housing 5. A retainer ring 6 retains the bearing assembly 3, and the spacer 7 maintains the distance between the bearing assemblies 4 and 3 in their positions within the housing 5.

The drive shaft 2 extends through the housing 5, and is integral with flange 8, which has a planar face contacting the hub 9. The pin 10 fastened in hub 9 extends through a notch in flange 8. The nut 28 firmly locks the hub 9 with the driving shaft 2. The hub 9 and the driving shaft 2 thus rotate as a single unit.

The hub 9 provides a rotatable mount for the driving spur gear 11 and the logarithmic spiral driving gear 12. Both of these driving gears are rotatable about the outer periphery of hub 9. The hub 13 on gear 11 contacts gear 12. The snap ring 15 maintains the axial position of the gears 11 and 12 relative to the hub 9.

The annular grooves 40 and 41 in sleeve 21 receive the ball 20 of the detent 18, comprising the spring 19 and a ball 20. The detent 18 provides a position retention of the sleeve 21 when the pin 22 which is mounted in the sleeve 21 is received within the axial slot 23 in the spur driving gear 11 or received within the axial slot 25 of logarithmic spiral driving gear 12. The slot 23 coincides with a slot 24 in the hub 9, when the gears are rotated to an extreme position. A similar slot 25 is also formed within the logarithmic driving spiral gear 12. The slot 24 in hub 9 and the slots 23 and 25 of the two gears are in radial alignment with each other, when the gears are rotated to an extreme position. In this position, the pin may be slid axially from one gear to the other, through the slot 24 in the hub 9. A knob 27 provides a manual means for reciprocating the sleeve 21 to engage the clutching means with the desired driving gear.

The driving spur gear 11 is constantly meshing with the driven spur gear 33 on the driven shaft 31. The driving logarithmic spiral gear 12 is constantly meshing with the driven logarithmic spiral gear 32. The gears 32 and 33 are separated by a spacer 16 and are non-rotatably fastened to the hub 30 by means of the pin 34. The pin 34 also extends through a notch in flange 35, which is integral with shaft 31. A nut 36 firmly locks the hub 30 with the driven shaft 31 to rotate as a unit. The output driven member 37 is fastened to the driven shaft 31 to provide an output means for the shaft 31.

The driven shaft 31 is rotatably supported by the bearing assembly 38 and 39. The bearing assemblies are seated within the housing 5 and maintain a constant center dimension with a driving shaft 2 due to the bushings 100 and 101 which are fastened to the shaft.

The shifting mechanism is operated through the knob 27. The knob 27 slides the sleeve 21 axially to place the pin 22 either into slot 23 of the spur gear 11 or the slot 25 of the logarithmic spiral gear 12. The groove 40 receives the ball 20 of the detent 18 to maintain the position of the pin 22 in the spur gear 11. When the sleeve 21 is moved to the second position, the pin 22 is received within the slot 25 of the logarithmic spiral gear 12. In this position, the groove 41 receives the ball 20 of the detent 18.

Figure 2:
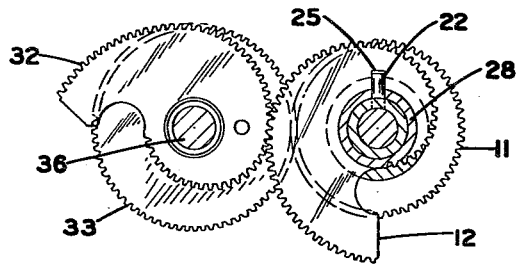
FIG. 2 is a cross-section view taken on line 4—4 of FIG. 1.

Referring to FIG. 2, the spur gears and the logarithmic spiral gears are shown in a cross-section view taken endwise on the shafts. It is noted that the pair of spur gears are in constant meshing engagement as are the logarithmic spiral gears.

The controlling element regarding the transmission ratio of the drive is the pin operated by the clutching means. If the pin is received within the slot of the spur gear, the spur gears provide the driving means. Accordingly, if the pin is received within the slot 25 of the driving logarithmic spiral gear, then the logarithmic gears transmit the driving means from the driving shaft 2 to the driven shaft 31. The unconnected driving gear does not provide any function in the power transmission between the driving shaft 2 and the driven shaft 1.

Figure 3:
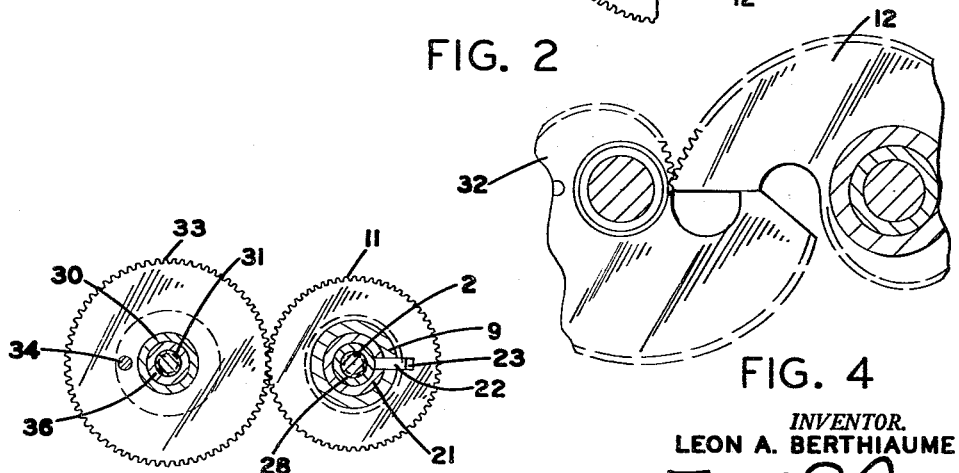
FIG. 3 is a cross-section view taken on line 3—3 of FIG. 1.

FIG. 3 is an illustration of the cross-section view of the spur gears.

The transmission operates in the following described manner. The driving shaft 2 is driven at a constant speed of rotation. The driving shaft 2 rotatably drives the hub 9. The hub 9 is received within the inner periphery of the driving spur gear 11 and the driving logarithmic spiral gear 12. The gears 11 and 12 are freely rotatable on the outer periphery of the bub 9. The driving spur gear 11 being in constant engagement with the driven spur gear 33, rotates the spur gear 33 in a predescribed ratio, depending upon the number of teeth in the two gears. The driven logarithmic spiral gear 32 is also in constant engagement with the driving spiral logarithmic gear 12. These two gears are also constantly engaging each other to maintain a rotation in a logarithmic ratio. The knob 27 is moved axially to insert the pin 22, either in the slot 23 of the spur gear 11, or the slot 25 of the logarithmic spiral driving gear 12. To accomplish this shifting of the clutch mechanism, the driving shaft 2 must be rotated to an extreme position, whereat the slot 23 of gear 11 and the slot 25 of gear 12 are radially aligned. Both pairs of gears being in constant meshing engagement, the drive is transmitted through the pin to the gear in which it is received, thereby providing the predescribed ratio of power transmission between the driving shaft 2 and the driven shaft 31.

Figure 4:
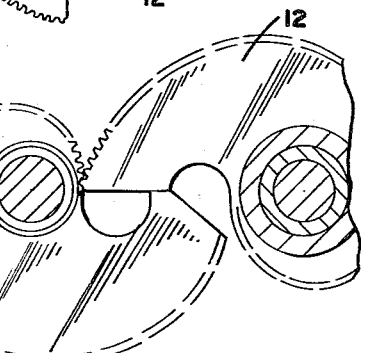
FIG. 4 is an enlarged cross-section view taken on line 4—4 of FIG. 1.

Referring to FIG. 4, the logarithmic spiral gears 12 and 32 are shown revolved to one extremity of the driving shaft range of rotational oscillation. At this extremity, the driving spiral gear is locked against further clockwise rotation by outer portion of driven spiral gear as shown.

The above described transmission is illustrative and not restrictive in setting forth the invention covered herein. Other modifications may illustrate and describe this invention without departing from the spirit of the invention. All equivalent disclosures falling within the principles of the invention are considered to be a part thereof.

I claim:

1. A gear transmission comprising, a driving means, a driven means, a constant gear ratio means connecting the driving means to the driven means through a clutching means, a logarithmic ratio gear means connecting the driving means to the driven means through the clutching means, said clutching means selectively connecting the desired ratio of gear means for transmitting a driving force between said driving means and said driven means.

2. A gear tranmission comprising, a driving shaft means, a driving gear rotatable on said driving shaft means, a driven shaft means, a driven gear engaging said driving gear non-rotatably connected to said driven shaft means, a second driving gear rotatable on said driving shaft means, a second driven gear non-rotatably connected to said driven shaft means and engaging said second driving gear and providing a logarithmic transmission relationship between said second driving and driven gears, clutching means selectively clutching said driving gears to the driving shaft means to provide the desired output of said transmission.

3. A gear transmission comprising, a driving shaft means, a driven shaft means, a driving spur gear rotatable on said driving shaft means, a driving logarithmic spiral gear rotatable on said driving shaft means, a driven spur gear non-rotatably connected to said driven shaft in constant meshing engagement with said driving spur gear, a driven logarithmic spiral gear non-rotatably connected to said driven shaft means and in constant engagement with said driving logarithmic spiral gear, clutching means selectively engaging said driving shaft means to one of said driving gears to provide the desired ratio of transmission from said driving gear means to said driven gear means.

4. A gear transmission comprising, a driving shaft means, a driven shaft means, a driving spur gear rotatably mounted on said driving shaft means, a driving logarithmic spiral gear rotatably mounted on said driving shaft means, a driven spur gear non-rotatably mounted on said driven shaft means in constant engagement with said driving spur gear, a driven logarithmic spiral gear non-rotatably mounted on said driven shaft means in constant meshing engagement with said logarithmic spiral driving gear, a clutching means including a sleeve, a protrusion on said sleeve, an opening in each of said driving gears for selectively receiving said protrusion on said sleeve, thereby providing a clutching arrangement for selectively and alternatively engaging each of said driving gears with said driving shaft to provide the desired ratio of output from said transmission.

5. A gear transmission comprising in combination, a support means, a driving shaft means rotatably supported by said support means, a driven shaft means parallel to said driving shaft means rotatably mounted in said support means, a driving spur gear rotatable on said driving shaft means, a driving logarithmic spiral gear rotatable on said driving shaft means, a driven spur gear non-rotatably connected to said driven shaft means in constant engagement with said driving spur gear, a driven logarithmic spiral gear in constant engagement with said driving spiral gear non-rotatably connected to said driven shaft means, a clutching means including a sleeve axially aligned with said driving shaft means, a locking element connected to said sleeve, a recess formed in said driving spur gear, a recess formed in said driving spiral gear, said recesses being radially aligned with said locking element when said gears operated to an extreme position, said locking element being selectively received within the recess of either of said driving gears to connect the desired driving gear to said driving shaft means for the desired output.

6. A gear transmission comprising, a support member, a driving shaft means rotatably mounted in said support member, a driven shaft means parallel to said driving shaft means rotatably supported in said support member, a driving spur gear rotatably mounted on said driving shaft means, a logarithmic spiral gear rotatably mounted on said driving shaft means, a driven spur gear fixedly connected to said driven shaft means and in constant engagement with said driving spur gear, a driven logarithmic spiral gear fixedly connected to said driven shaft means and in constant engagement with said driving logarithmic spiral gear transmitting a logarithmic relation of output from said driven shaft means relative to said driving shaft means, clutching means including a shaft and locking member, a recess formed in each of said driving gears for selectively alternatively receiving said locking element to provide the desired ratio of transmission from said driving shaft means to said driven shaft means.

References Cited in the file of this patent

UNITED STATES PATENTS

| | | |
|---|---|---|
| 693,523 | Knox | Feb. 18, 1902 |
| 783,588 | Nixon | Feb. 28, 1905 |

FOREIGN PATENTS

| | | |
|---|---|---|
| 475,179 | Italy | Oct. 17, 1952 |

OTHER REFERENCES

Product Engineering, March 14, 1960, pages 59–66. (Copy available in Div. 12.)